United States Patent
Carlo (12)

(10) Patent No.: US 6,764,263 B2
(45) Date of Patent: Jul. 20, 2004

(54) SELF-THREADING SCREW PROVIDED WITH A POINT AND APPARATUS TO PRODUCE IT

(76) Inventor: Sala Carlo, Via Roma, 101, 27025 Gambolo' (Province of Pavia) (IT)

(*) Notice: Subject to any disclaimer, the term of this patent is extended or adjusted under 35 U.S.C. 154(b) by 34 days.

(21) Appl. No.: 09/753,027

(22) Filed: Jan. 2, 2001

(65) Prior Publication Data

US 2001/0007629 A1 Jul. 12, 2001

(30) Foreign Application Priority Data

Jan. 11, 2000 (IT) ..................................... MI2000A0022

(51) Int. Cl.[7] ............................. F16B 25/00; F16B 25/10
(52) U.S. Cl. .................. 411/386; 411/387.1; 411/387.4
(58) Field of Search .............................. 411/386, 387.1, 411/387.2, 387.3, 387.4, 387.5

(56) References Cited

U.S. PATENT DOCUMENTS

| | | | | |
|---|---|---|---|---|
| 3,094,894 A | * | 6/1963 | Broberg | 411/387.4 |
| 5,234,301 A | * | 8/1993 | Grossberndt et al. | 411/386 |
| 5,827,031 A | * | 10/1998 | Swallow | 411/387.4 |
| 6,158,938 A | * | 12/2000 | Savoji | 411/386 |
| 6,328,515 B1 | * | 12/2001 | Donovan | 411/386 |

* cited by examiner

*Primary Examiner*—Neill Wilson
(74) *Attorney, Agent, or Firm*—Hedman & Costigan, P.C.

(57) ABSTRACT

A self-threading screw is described which includes a (basically) conical point set at the end of its shank opposite that where the head is housed, and a sunken zone set between the end of the screw shank and the conical point.

In addition, an apparatus is described to produce a self-threading screw provided with a point and a sunken zone, in which at least the thread of the self-threading screw, the conical point and the sunken zone are simultaneously produced by rolling.

9 Claims, 4 Drawing Sheets

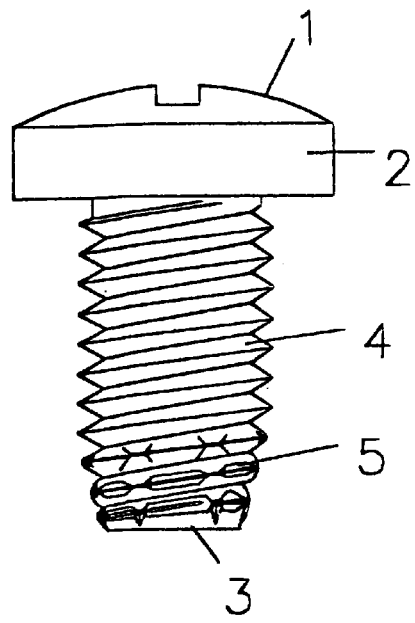
FIGURA 1
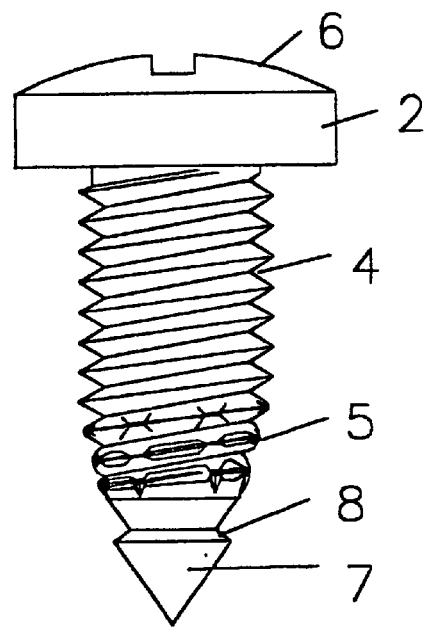
FIGURA 2
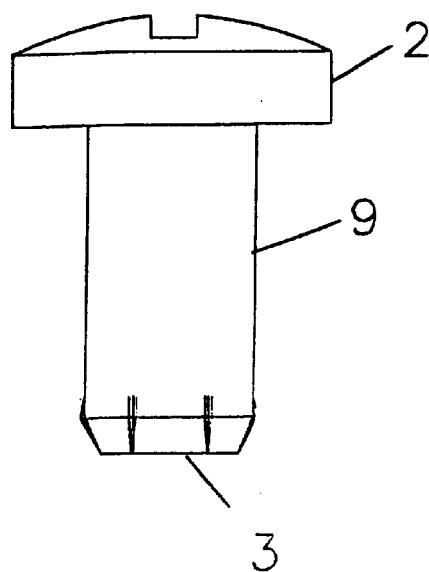
FIGURA 3
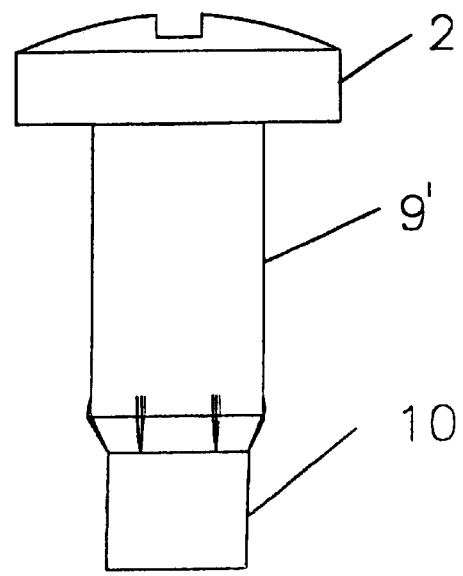
FIGURA 4

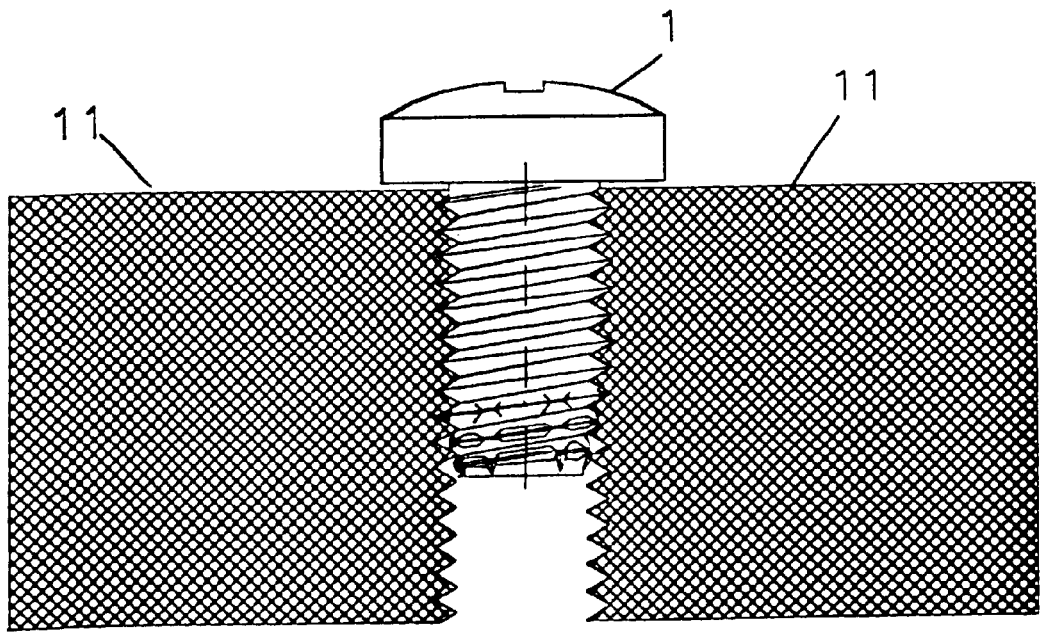
FIGURA 5
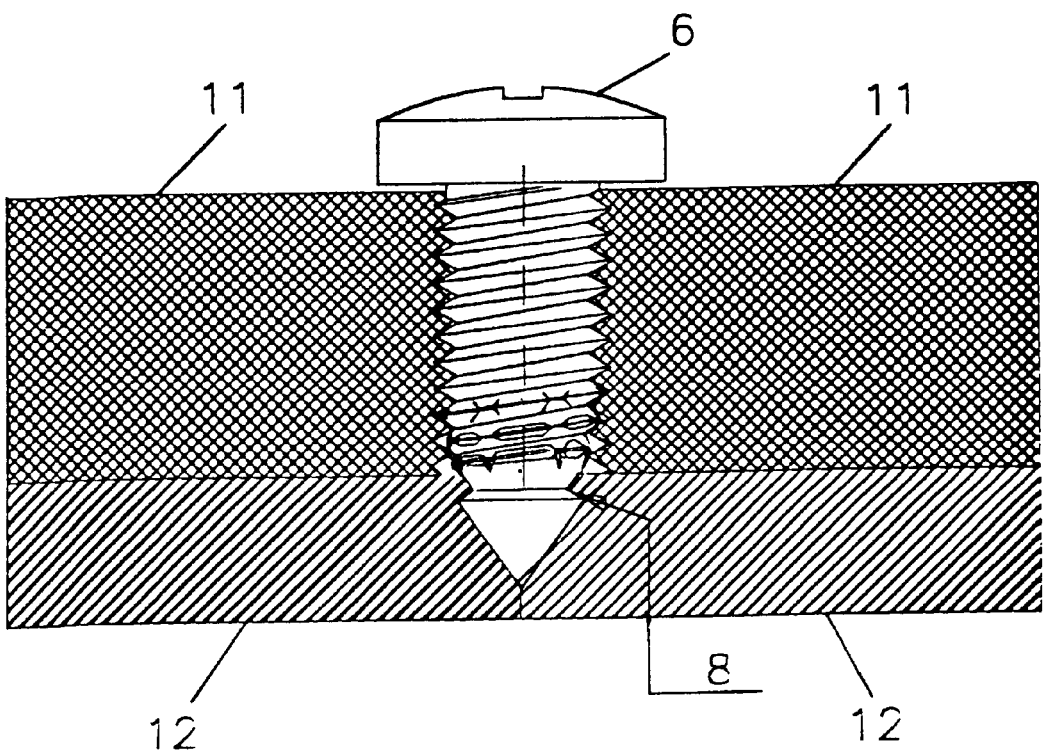
FIGURA 6

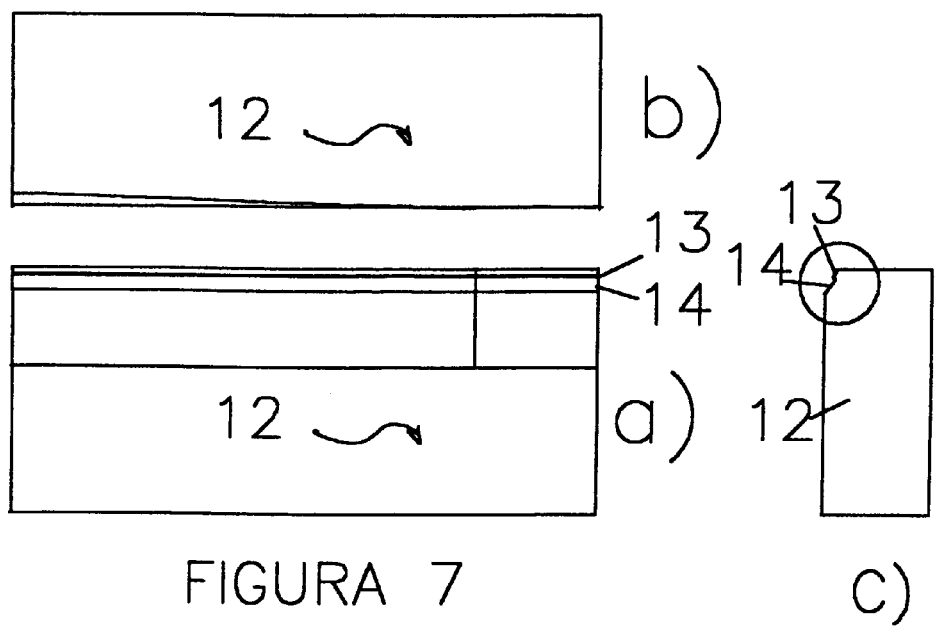
FIGURA 7
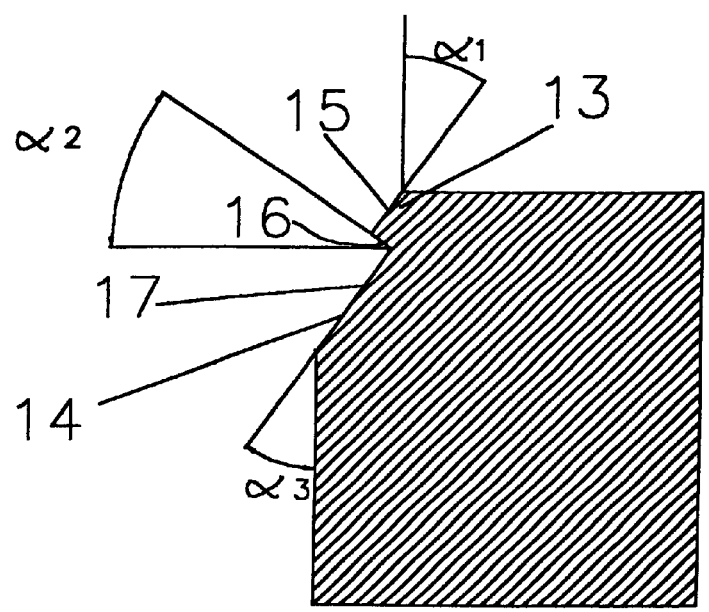
FIGURA 8

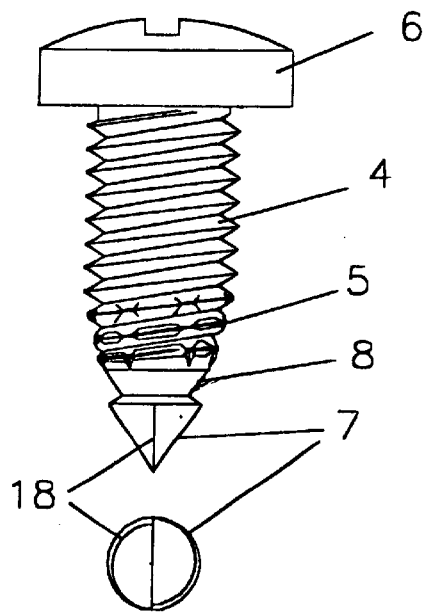
FIGURA 9
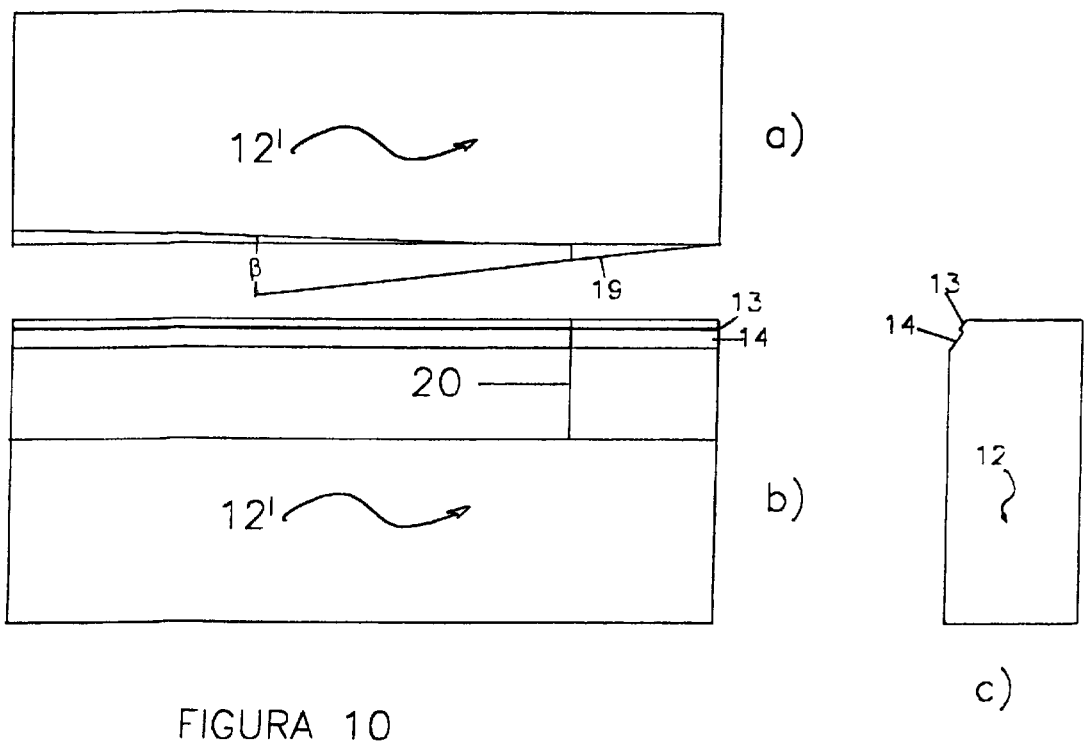
FIGURA 10

SELF-THREADING SCREW PROVIDED WITH A POINT AND APPARATUS TO PRODUCE IT

FIELD OF THE INVENTION

The invention consists of a self-threading screw which includes a (basically) conical point set at the end of its shank opposite that where the head is housed, and a sunken zone set between the end of the screw shank and the conical point; in addition, an apparatus to produce such a self-threading screw is disclosed, in which at least the thread of the self-threading screw, the conical point and the sunken zone are simultaneously produced by rolling.

PREVIOUS TECHNIQUE

Self-threading screws (i.e. screws suitable to produce, on the wall of the holes into which they are inserted, a thread of complementary profile to that of the thread on the screw shank) have been known for a long time, widely available on the market and much used in the technique to join two parts made of metallic material.

Screws have been put on the market, the shank of which has, at its free end, four or (preferably) six prismatically shaped "moulders" set at regular intervals along the external circumference of the free end of the screw shank: such moulders are suitable to roll the material making up the body to be threaded thus obtaining, along the wall of the hole (without requiring any additional mechanical operations), a highly resistant complete screw thread, whose threads have intact fibres and are slightly hardened by the pressure generated by the same moulding.

The known type of self-threading screws, produced by rolling and including four or (preferably) six prismatically shaped moulders are very convenient and advantageous to thread the walls of a hole, but are not fit to be used to assemble two plates with holes, whose holes are rarely exactly in line with each other.

In fact, the free end of the self-threading screws currently available have a truncated form (or, in any case, unpointed) which makes it extremely difficult (if not practically impossible) to insert such screws into the hole present in the plates to be assembled if such holes are not perfectly aligned.

This problem, widespread in the industry of light metal structural work, had still not been solved in an economic way since it was not possible, until now, to produce by rolling a screw having a pointed end without having to resort to additional mechanical operations, thus resulting in a high screw cost which puts the same screw outside the market: in fact it has not been possible until now to thread the screw shank by rolling and simultaneously form the point since (with the apparatuses used so far) the stress applied to the screw shank to form the point tends to expel the screw itself from the thread chasers used to thread the screw shank and to make any moulders on it, resulting in serious damage to the screw thread.

Experimental research and tests carried out by the applicant have found a solution for this "technical inconvenience", producing a self-threading screw by rolling, which includes a (basically) conical point by using an apparatus, derived from that normally used to produce a self-threading screw of known type, which allows the simultaneous production of at least the screw thread of the self-threading screw and of its conical point, without risking damaging the screw thread itself.

SUMMARY OF THE INVENTION

The subject of the present invention is a self-threading screw which includes a (basically) conical point set at the end of its shank opposite that where the head is housed, and a sunken zone set between the end of the screw shank and the conical point.

An additional subject of the present invention is an apparatus suitable to produce a self-threading screw having a conical point and a sunken zone, which includes an additional pair of thread chasers (set under those which produce the thread and any moulders of the self-threading screw) suitable to produce the conical point and the sunken zone: the thread (and any moulders) of the self-threading screw, the conical point and the sunken zone are simultaneously produced by rolling.

LIST OF FIGURES

The invention will now be better described with reference to the embodiments, supplied as non-limiting examples, relating to self-threading screws, shown in the enclosed figures in which:

FIG. 1 shows a side view of a self-threading screw of known type;

FIG. 2 shows a side view of a self-threading screw produced according to the invention;

FIG. 3 shows a side view of a known semi-finished part, from which the known self-threading screw of FIG. 1 is made by rolling;

FIG. 4 shows a side view of a semi-finished part from which the self-threading screw of FIG. 2 is made by rolling;

FIG. 5 outlines a sectional view of a known apparatus to make the known self-threading screw of FIG. 1 from the semi-finished part of FIG. 3 by rolling;

FIG. 6 outlines a sectional view of the apparatus of FIG. 5, modified according to the invention, to make the self-threading screw of FIG. 2 from the semi-finished part of FIG. 4 by rolling;

FIG. 7 shows a front view, a plan view and a side view (not to scale) of one of the thread chasers used to make by rolling, from the semi-finished part of FIG. 4, the point and the sunken zone of the self-threading screw according to the invention shown in FIG. 2;

FIG. 8 shows an enlargement of the part highlighted in the side view of FIG. 7;

FIG. 9 shows a side view and a view from below of an additional embodiment of a self-threading screw produced according to the invention;

FIG. 10 shows a plan view, a front view and a side view (not to scale) of one of the thread chasers used to make by rolling, from the semi-finished part of FIG. 4, the point of the self-threading screw according to the invention shown in FIG. 9.

In the figures enclosed, the corresponding parts will be identified by the same reference numbers.

DETAILED DESCRIPTION

FIG. 1 shows a side view of a self-threading screw 1 of known type, which includes a head 2 and a shank 9 (FIG. 3) having a flat end surface 3, on the side shell of which the thread 4 and the moulders 5 have been made, in a way in itself known, by rolling.

The characteristics of the moulders 5 and the means (hereafter called "thread chasers" and denoted by 11 in FIGS. 5 and 6) which allow the production of the thread 4 and of the moulders 5 by rolling will not be described here since they are well known to a person skilled in the art and, in any case, they are unrelated to the present invention.

FIG. 2 shows a side view of a self-threading screw 6 produced according to the invention which includes a head 2 and a shank 9' (FIG. 4) on the side shell of which the thread 4 and moulders 5 have been produced, in a way in itself known, by rolling: the self-threading screw 6 produced according to the invention differs from that known 1 in that it includes a (basically) conical point 7 set at the end of its shank 9' opposite that where the head 2 of screw 6 is housed, and a sunken zone 8 (preferably made up of two opposite truncated cones sharing the same lower bases) set between the end of the shank 9' and the point 7.

FIG. 3 shows a side view of a known, semi-finished part, from which the known self-threading screw 1 of FIG. 1 is made by rolling; FIG. 3 clearly shows the head 2 and the shank 9 having a flat end surface 3.

FIG. 4 shows a side view of a semi-finished part from which the self-threading screw 6 of FIG. 2 is made by rolling, such semi-finished part differs from that in FIG. 3 essentially in that its shank 9' has, at the end opposite the head 2, a cylindrical body 10 of sufficient volume to allow the making of the conical point 7. Preferably, but not necessarily, the cylindrical body 10 has a diameter roughly equal to the minimum thread diameter of the screw set by the ISO standards for the particular screw and a height no less than said minimum diameter.

FIG. 5 outlines a sectional view of a known apparatus to make the known self-threading screw 1 of FIG. 1 from the semi-finished part of FIG. 3 by rolling; FIG. 5 clearly shows, in section, a pair of thread chasers 11 (known in themselves) between which the known self-threading screw 1 is set.

FIG. 6 outlines a sectional view of the apparatus of FIG. 5, modified according to the invention, to make the self-threading screw 6 according to the invention from the semi-finished part of FIG. 4 by rolling.

From FIG. 6 it can be seen that the apparatus, according to the invention, includes an additional pair of thread chasers 12 (shown in section) set under the aforesaid thread chasers 11 (which they are integral with) and suitable to form by rolling (simultaneously with the formation by rolling of the thread 4 and of moulders 5 by the thread chasers 11) the point 7 and the sunken zone 8; the additional thread chasers 12 (more visible in FIGS. 7 and 8) have a protruding zone 13 (FIGS. 7 and 8) which, apart from creating the sunken zone 8, hold the semi-finished part in place preventing its expulsion from the thread chasers 11 used to thread the shank 9' of screw 6 and to make the moulders 5; thus any risk of damaging the screw 6 thread is avoided while the conical point 7 is formed. Additional structural characteristics of the thread chasers 12 will not be discussed here as they correspond to those of thread chasers 11 known and, in any case, they are unrelated to the present invention.

FIG. 7 shows a front view (FIG. 7a), a plan view (FIG. 7b) and a side view, not to scale, (FIG. 7c), of one of the thread chasers 12 used to make the point 7 and the sunken zone 8 of the self-threading screw 6 of FIG. 2 from the semi-finished part of FIG. 4 by rolling; this thread chaser 12 differs from a known thread chaser used to make the self-threading screw 1 of FIG. 1 by rolling, essentially in that it has the protruding zone 13 along its upper edge which, together with the underlying recess 14, allows the production of the point 7 and of the sunken zone 8 of the self-threading screw 6 by rolling.

The protruding zone 13 and the recess 14, visible in the front view of FIG. 7a and in the side view of FIG. 7c, will be described in more detail with reference to FIG. 8 which shows an enlargement of the part highlighted in the side view of FIG. 7c.

From FIG. 8 it can be seen that the protruding zone 13 is delimited by a first and by a second surface (15, 16), inclined in opposite directions, while the recess 14 is delimited by the second inclined surface 16 and by a third surface 17, inclined in the opposite direction to that of the second inclined surface 16.

The first inclined surface 15 forms a first angle $\alpha 1$ as regards the side surface (vertical) of the thread chaser 12, the second inclined surface 16 forms a second angle $\alpha 2$ as regards the upper surface (horizontal) of the thread chaser 12 and the third inclined surface 17 forms a third angle $\alpha 3$ as regards the side surface (vertical) of the thread chaser 12.

Preferably, but not necessarily, the three angles ($\alpha 1$, $\alpha 2$, $\alpha 3$) are all basically equal; in a preferred embodiment, each of the three angles ($\alpha 1$, $\alpha 2$, $\alpha 3$) is approx. ($35\pm5$) degrees.

The angle at the top of the protruding zone 13 is therefore approx. ($90+\alpha 1-\alpha 2$) degrees; if the two angles ($\alpha 1$, $\alpha 2$) are basically equal, the angle of the top of the protruding zone 13 is approx. 90 degrees, if the two angles ($\alpha 1$, $\alpha 2$) are approx. ($35\pm5$) degrees, the angle at the top of the protruding zone 13 is approx. ($90\pm10$) degrees.

The surfaces that delimit the sunken zone 8 of a self-threading screw 6 produced by a pair of thread chasers 12 are parallel to the first and second surface (15, 16) which delimit the protruding zone 13 and therefore form the first angle $\alpha 1$ as regards the vertical, respectively the second angle $\alpha 2$ as regards the horizontal; the angle at the top of the sunken zone 8 is therefore approx. ($90+\alpha 1-\alpha 2$) degrees.

If the first angle $\alpha 1$ is basically equal to the second angle $\alpha 2$, the angle at the top of the sunken zone 8 is approx. 90 degrees, if the size of the first and second angle ($\alpha 1$, $\alpha 2$) is approx. ($35\pm5$) degrees, the angle at the top of the sunken zone 8 is approx. ($90\pm10$) degrees.

Similarly, the generatrix of the conical point 7 of a self-threading screw 6 produced by a pair of thread chasers 12 is parallel to the third surface 17 which delimits the recess 14 and therefore forms the third angle $\alpha 3$ with the longitudinal axis of symmetry of the self-threading screw 6; if the third angle $\alpha 3$ is approx. ($35\pm5$) degrees, the angle at the top of the conical point 7 is approx. ($70\pm10$) degrees.

FIG. 9 shows a side view and a view from below of an additional embodiment of a self-threading screw 6 produced according to the invention, which differs from that shown in FIG. 2 essentially in that, on its conical point 7', a pair of cutting edges 18 is produced, identical to those normally produced at the end of a helicoidal point of known type, which allows the insertion of the self-threading screw 6 into a hole having a diameter much smaller than that of the screw 6, said being widened by the cutting edges 18 until brought to the optimum size for the insertion of the self-threading screw 6.

FIG. 10 shows a plan view (FIG. 10a), a front view (FIG. 10b), and a side view, not to scale, (FIG. 10c) of one of the thread chasers 12' used to make the conical point 7' and the sunken zone 8 of the self-threading screw 6 of FIG. 9 from the semi-finished part of FIG. 4 by rolling; such a thread chaser 12' differs from the thread chaser 12 shown in FIG. 7 basically in that it has, at the end portion of its protruding zone 13, an additional inclined surface 19 suitable to form the cutting edges 18 by rolling; the additional inclined surface 19 is visible in the plan view of FIG. 10a and its edge is indicated by line 20 in the front view of FIG. 10b.

The additional inclined surface 19 forms an angle β of approx. 4 degrees (and, in any case, between approx. 3 and 5 degrees) with the longitudinal axis of symmetry of thread chaser 12'.

Without leading away from the scope of the invention it is possible for a person skilled in the art to carry out all the alterations and improvements suggested by normal experience and the natural development of the technique to the self-threading screw provided with a point and to the apparatus to produce it.

What is claimed is:

1. A self-threading screw comprising
   a shank (9) on which a thread is made;
   a head (2) of the screw housed at a first end of said shank;
   a conical point (7, 7') set at a second end of said shank opposite that where said head (2) of the screw (6) is housed;
   a sunken zone (8) set between said conical point and said second end;
   wherein said screw is made by rolling substantially simultaneously said thread, said conical point and said sunken zone.

2. A self threading screw as in claim 1, wherein the sunken zone (8) consists of two opposite truncated cones sharing the same lower base.

3. A self-threading screw as in claim 2 wherein said sunken zone (8) is delimited by a first and by a second surface inclined in opposite directions, the first inclined surface forming a first angle (α1) as regards the vertical, the second inclined surface forming a second angle (α2) as regards the horizontal, the angle at the top of the sunken zone (8) being approximately (90+α1−α2) degrees.

4. A self-threading screw as in claim 5, wherein the first angle (α1) is basically equal to the second angle (α2) and that the angle at the top of the sunken zone (8) is approximately 90 degrees.

5. A self-threading screw as in claim 5, wherein the size of the first and second angle (α1, α2) is approximately (35±5) degrees and in that the angle at the top of the sunken zone (8) is approximately (90±10) degrees.

6. A self-threading screw as in claim 1, wherein the generatrix of the conical point (7, 7') forms an angle (α3) with the longitudinal axis of symmetry of the self-threading screw (6).

7. A self-threading screw as in claim 8, wherein angle (α3) with the longitudinal axis of symmetry of said self-threading screw (6) is approximately (35±5) degrees an in that the angle at the top of the conical point (7, 7'is approximately (70±10) degrees.

8. A self-threading screw as in claim 1, wherein it also includes a pair of cutting edges (18) made on the external surface of the conical point (7'), said cutting edges (18) extending on the surface of the conical point, from the vertex if said conical point to the base of said conical point.

9. A self-threading screw which consists essentially of:
   (a) a shank (9) on which a thread is made;
   (b) a head (2) of the screw housed at a first end of said shank;
   (c) a conical point (7, 7') set at a second end of said shank opposite the end where said head (2) of the screw (6) id housed;
   (d) a sunken zone (8) set between said conical point and said second end; said threads extending up to said sunken zone.

* * * * *